United States Patent
Brisse et al.

[15] 3,706,992
[45] Dec. 19, 1972

[54] CONSTANT-DUTY TRANSPONDER

[72] Inventors: Jacques Daniel Philippe Brisse, 92-Saint-Cloud; Jean-Claude Joguet, 92-Boulogne-Billancourt, both of France

[73] Assignee: International Standard Electric Corporation, New York, N.Y.

[22] Filed: July 23, 1970

[21] Appl. No.: 57,668

[52] U.S. Cl. ............................................. 343/6.8 LC
[51] Int. Cl. ................................................. G01s 9/56
[58] Field of Search ........... 343/6.8 R, 6.8 LC, 106 R

[56] References Cited

UNITED STATES PATENTS 3,454,948   7/1969   Reinagel ........................... 343/106 R
2,938,202   5/1960   Kirch et al. ..................... 343/6.8 R X
3,178,706   4/1965   Clock .............................. 343/6.8 LC Primary Examiner—Malcolm F. Hubler
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to a high efficiency transponder of the type which receives and decodes interrogation pulse pairs and transmits reply pulse pairs. Filler pulses (squitter) are transmitted to achieve a constant duty operation. Squitter is initiated by a local noise pulse generator, not be receiver noise. Therefor, the countdown due to dead-time following decoding of the squitter is eliminated and recognition of genuine interrogations is not inhibited.

8 Claims, 2 Drawing Figures

CONSTANT-DUTY TRANSPONDER

BACKGROUND OF THE INVENTION

The present invention relates to transponder circuits used in radio navigation systems and more particularly to circuits which improve the response efficiency of a high transmission rate transponder.

In known radio navigation systems, such as the DME (Distance measuring equipment) an aircraft transmitter sends, to all bearings, interrogation (inquiry) pulses on a carrier frequency which is characteristic of a responder radio-beacon located on the ground, also known as a transponder.

The transponder receives the inquiry signal, detects it and uses it to remodulate a transmission of pulses, termed "response pulses," the carrier frequency of which differs from the received frequency. The response signal transmitted in this way by the transponder is received by the interrogating aircraft.

The aircraft radio equipment measures time t which elapses between the transmission of the inquiry signal and the reception of the response signal. This period of time increases linearly according to the distance D between the aircraft and the antenna of the transponder. The transponder, imposes given delays for the transmission and the processing of the transmitted or received signals. That is, the transponder equipment is adjusted via adjustable delay lines or shift registers, for instance, so as to introduce a systematic delay period $t_o$; distance D is then: $D = \frac{1}{2} c (t - t_o)$, where c is the speed of light.

In another well-known system, namely the TACAN (Tactical Air Navigation), the interrogating aircraft receives, from the transponder, two pieces of information allowing it to determine its distance D and its bearing with respect to said transponder.

The distance measuring function in the TACAN is effected by means very similar to those implemented in the DME system in its original form; thus in the following description we shall confine ourselves, to the characteristics of the present TACAN as defined for instance in the MIL standards published by the United States Defense Department.

In TACAN systems, inquiry interrogation signals like response signals are constituted by pairs of pulses; the two pulses which make up a pair each have an average duration of $(t_d)=3.5$ microseconds and their leading edges are separated by a time $t_i$, which, in most current applications, amounts to 12 microseconds.

As was pointed out above, a systemic delay $t_o$ of 50 microseconds is introduced into the transponder equipment between the second (or first) pulse of a pair of received inquiry pulses and the second (or first) pulse of a pair of transmitted response pulses.

One of the basic characteristics of the TACAN system lies in the fact that the transponder transmitter, regardless of whether it is receiving inquiries from aircraft or not, continuously transmits (each second) N pairs of pulses ($N = 2\,700$ in known systems). In the absence of inquiries these N pairs of pulses — filling pulses — are generated by a local generator of N noise pulses distributed randomly in time and which simulate inquiry recognition pulses and response triggering pulses which normally appear at the output of the decoder. If genuine inquires are in fact detected and recognized, they replace some of the randomly distributed noise pulses. A pulse counter located at the output of the coder acts upon, via an automatic control device, the noise pulse generator, so as to reduce the number of pulses it generates per second.

In these conditions, the transponder transmitter transmits (each second) a constant number N of pulse pairs without regard to whether they represent recognition of a genuine inquiry or merely pulses from the local generator. The main advantage of this system is that it makes it possible to operate the transponder radio-frequency transmitter at a constant average power, thus facilitating operation and maintenance. A further advantage is that, in the case of the TACAN, the "filling" pairs of pulses generated by the transponder local pulse generator provide all aircraft, even where part of their distance measuring equipment is lacking, with bearing information with respect to the transponder.

It should be noted, incidentally, that when a large number of aircraft are submitting inquiries, the number of real inquiries can reach or exceed the value of N per second. The "filling" pulses then disappear and the automatic control associated with the counter of response pulse pairs acts upon the receiver of the transponder so as to make it refuse lower level inquiries. The modes of implementation of these devices which limit the number of responses to inquiries to N per second are well known and are not within the scope of the present invention.

The TACAN system has another limitation constituted by minimum dead time $t_m$ which must separate two successive pairs of pulses transmitted by the transponder.

This dead time is necessary owing to various technical considerations arising for instance out of the operation of the transponder transmitter, or that of the aircraft receivers which use the filling pulse pairs to measure the bearing. This dead time is also necessary in a case where a real inquiry may be followed by "ghost" inquiries, which in fact correspond to multiple radioelectric paths between the aircraft transmitter and the transponder receiver.

In current known systems, inhibition gates — operating during time $t_m$, which follow the appearance of a response triggering pulse — prevent, on the one hand the decoding of subsequent genuine inquiry pairs or even the operation of the receiver and, on the other hand, bar access to the input of the coder for noise pulses generated by the local generator. In the current TACAN, dead time $t_m$ equals 60 microseconds.

In some current systems, when inadequate decoupling of the transponder receiver and the transponder transmitter occurs, it is necessary, in order to ensure operational reliability of the receiver, to inhibit the latter for the duration of the response pairs transmission. This inhibition must begin approximately at time $t_o - t_i$ which follows the triggering off of the coding process and continues up to time $t_o$. In current systems, time $t_o$ (50 microseconds) is shorter than dead time $t_m$ (60 microseconds) defined above, so that inhibiting the receiver for time $t_m$ also ensures its protection during transmission.

Said dead time $t_m$ reduces the efficiency of response (r) of the transponder, defined as the ratio of the number of responses to interrogations, to the total number of N inquiries which the transponder can receive mathematically, r may be:

$$r = (1/1 + Nt_m)$$

In present implementations, r also measures the probability of any inquiry giving rise to a response from the transponder. In other words, if the transponder receives inquiries from a small number of aircraft sending n inquiries per second (n being much lower than N) and does not have the means to process inquiry recognition pulses differently from the pulses generated by the local generator, efficiency r is that obtained when N inquiries occur.

With the usual values indicated above ($N = 2\,700$ and $t_m = 60$ microseconds), r has a maximum value of 85 percent.

Now, to increase the quantity of distance information per second sent out to a group of aircraft interrogating a transponder, or to increase the accuracy of bearing measurements in the area covered by a TACAN transponder, it is necessary to increase the transmission rate of the response pulse pairs. If N is increased to 10,000 and if a dead time $t_m$ of 60 microseconds is retained, the response efficiency r of the transponder is less than as 60 percent of its maximum, which is too low to be compatible with smooth operation of the aircraft equipment.

This can be remedied simply by decreasing $t_m$ to an extent compatible with the proper utilization of the system, for instance if $t_m = 35$ microseconds, r has a maximum value of 74%.

However, even that improvement is still insufficient. In many modern applications nearly 100 percent efficiency is required where the number of interrogating aircraft is small.

The present invention therefore offers devices which, associated with reception, decoding, coding and transmission circuits of the type normally used in transponders, increase response efficiency and whereby an almost 100 percent efficiency can be achieved where the number of interrogations is low. The devices offered by the present invention make it possible to give top priority to interrogations and to the corresponding response pulse pairs over noise pulses from the local generator and the "filling" pulse pairs they generate. They allow for:

minimum spacing (or dead time) between the transmitted pulse pairs;

where required, inhibition protection of the reception circuits during the transmission duration of each pair only;

response efficiency compatible with the smooth operation of the aircraft equipment.

The transponder equipment, (which is well-known in itself), into which we have incorporated the devices according to the invention, schematically comprises well-known components which are as follows:

a radio frequency receiver and detected video frequency pulse shaping components;

a decoder for recognizing pairs of pulses at $t_i$ intervals according to the agreed inquiry mode;

a logic device which inhibits the decoder input for dead time $t_m$ after the recognition of an inquiry pair;

a delaying line ($t_o - T - t_i$) whereby a systemic internal delay $t_o$ is introduced between the second (or first) pulse of the received interrogation and the second (or first) pulse of the response transmitted (T equals the sum of unavoidable, but, well known, delays arising from certain components of the transponder, in particular from the reception intermediate frequency stages and from the transmitting stages);

a coder for response pulse pairs separated by a $t_i$ interval;

devices to shape said response pulses, a radio frequency energy modulator and a radio frequency transmitter;

a generator yielding a maximum of N random distributed noise pulses per second at minimum intervals equal to $t_m$, each noise pulse generating a pair of "filling" pulses;

an automatic control system controlled by a transmitted pulse pair counter whereby the number of pulses generated per second by the noise generator can be reduced to $N - n$ if, during the same time, n pairs of pulses corresponding to genuine responses are transmitted.

SUMMARY OF THE INVENTION

It is an object of the present invention to provide a means for preventing noise pulses produced by the local generator from being introduced into the response pulse coding circuits, during time T which follows the recognition of an inquiry pair. T is at least equal to the time which elapses between the recognition of an inquiry and the transmission of the first corresponding response pulse, therefore T is at least equal to delay ($t_o - T - t_i$) of the delay line which precedes the coder.

According to another characteristic of the invention, noise pulses generated by the local generator are directly introduced at the input of the coding circuits and not at the input of the delay line which precedes said coding circuits.

Due to the aforementioned characteristics of the invention, the transmission of "filling" pulse pairs is prevented at least until a genuine response has been given to the inquiry.

According to a further characteristic of the invention, means are provided whereby noise pulses generated by the local generator are barred entry to the coding circuits during dead time $t_m$ which follows the generation of the first genuine pulse or of a "filling" pair.

In some transponder implementations, the decoupling between the transmitter and the receiver is inadequate in which case the latter should be inhibited for a given period.

According to a modification of the invention, means are provided whereby the receiver is only inhibited for the duration of the transmission of a response pulse pair, i.e. for duration $t_u$ equal to $t_i + 2t_d$.

In order to appreciate the advantages of the invention, one should compare the response efficiencies obtained in the various cases.

In current prior art type systems, response efficiency for a small number n of inquiries is independent of said number n and is given in the following relation:

$$r_m = 1/1 + Nt_m$$

In systems comprising devices according to the invention including those which make it possible to inhibit the receiver for the transmission duration, efficiency stands at:

$$r_u = 1/1 + Nt_u$$

Finally, in systems comprising devices according to the invention but lacking receiver inhibition capabilities, efficiency is:

$$r_o = 1/1 + nt_m$$

$r_o$ may be almost 100 percent where the number of inquiries is low.

According to a preferred embodiment of the invention, the second pulse of each decoded inquiry is sent to the input of a first delay shift register, the total delay of which is approximately $t_o - T$, the last stages of which serve as a coder, the first response pulse coming out of the output of the stage which corresponds to a delay $(t_o - T - t_i)$; similarly each noise pulse yielded by the local generator is sent to the input of a second shift register yielding a delay $t_i$, and the sole purpose of which is to code "filling" pulses. The first pulse outputs of the two registers are united via a first "OR" gate and the second pulse outputs of the said registers are united via a second "OR" gate.

This embodiment is advantageous since internal delay $t_o$ of the transponder can be achieved with the accuracy generally required.

The objects and characteristics of the present invention will become clear from the following description and reference to the accompanying drawings in which:

DESCRIPTION OF THE PREFERRED EMBODIMENTS

Known components not necessary to the understanding of the principle of the invention have not been included in the two figures. In particular the antenna array which produces a revolving response pattern characteristic of the TACAN and the identification signal generating circuits have been omitted.

Figure 1:
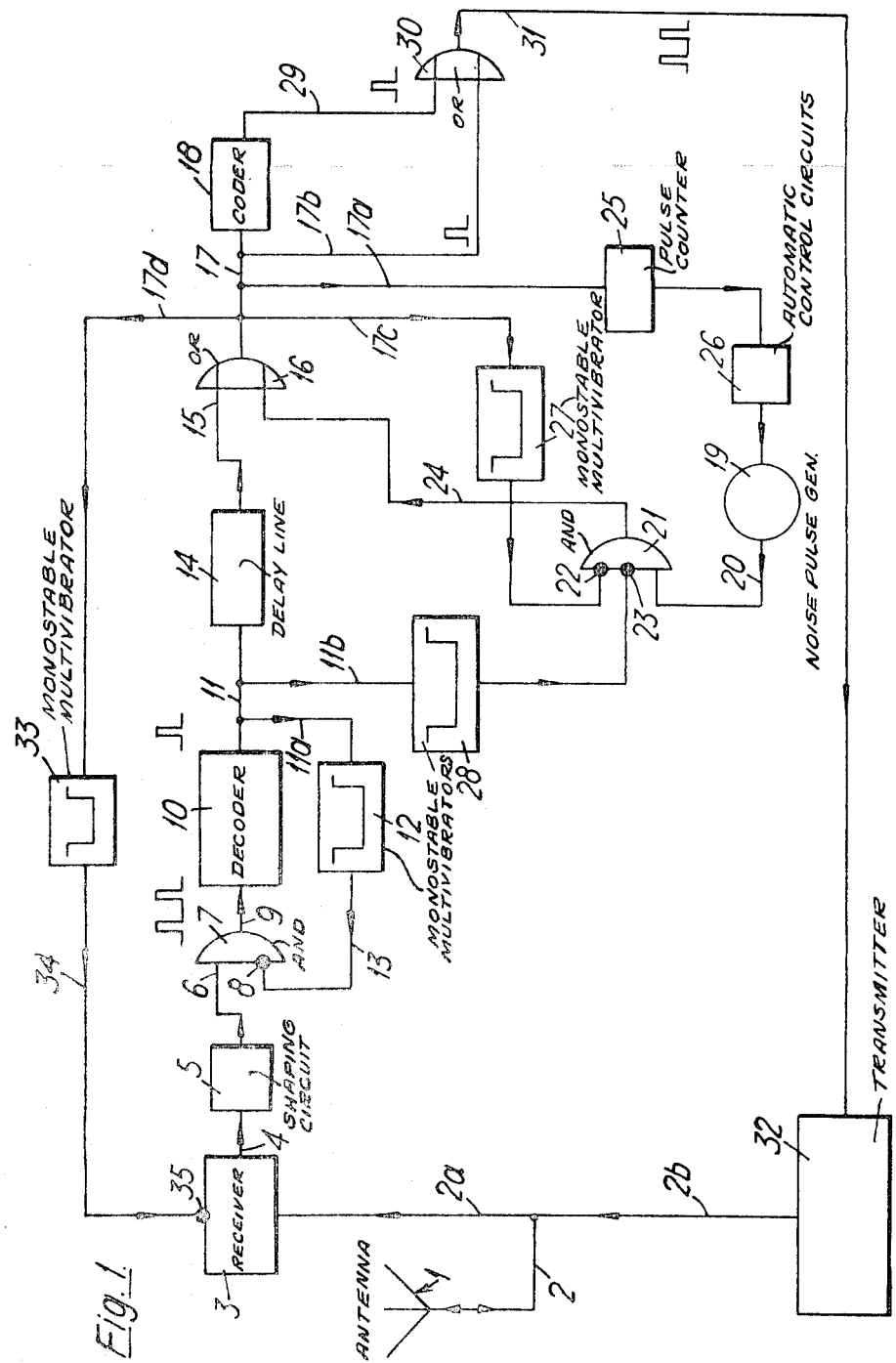
FIG. 1 shows an operational diagram of a TACAN system transponder incorporating the devices according to the invention.

The equipment shown in FIG. 1 has a transmitting and receiving antenna 1. The radio frequency signals it receives are directed by a link 2, and its branch 2a, to a receiver 3. Video frequency pulses and in particular, interrogation pulse pairs arrive via wire 4 at shaping circuit 5. The output of 5 is connected via wire 6 to an input of "AND" gate 7 which also has an inhibition input 8. The output of 7 is connected via lead 9 to an interrogation pulse pair decoder 10. A lead 11 and its branch 11a connect the output of 10 to the input of branch 11a connect the output of 10 to the input of monostable multivibrator 12, the output of which is connected via lead 13 to inhibition input 8 of "AND" gate 7.

Lead 11 connects the output of 10 to the input of delay line 14, the output of which is connected via wire 15 to one of the two inputs of "OR" gate 16. A lead 17 links the output of 16 to the input of response pulse pair coder 18 made up, for instance, of a shift register.

A random distribution noise pulse generator 19, sends, via lead 20, noise pulses to an input of "AND" gate 21 which also has two inhibition inputs 22 and 23.

The output of 21 is connected via lead 24 to the second input of "OR" gate 16. A branch 17a of lead 17 is connected to pulse counter 25 which, via automatic control circuits represented by unit 26, makes it possible to maintain the number of noise pulses generated per second by generator 19 at the required value.

Via branch 17c, the output of gate 16 is connected to a monostable multivibrator 27, the output of which is connected to inhibition input 22 of gate 21. Via a branch 11b the output of decoder 10 is connected to monostable multivibrator 28, the output of which is connected to inhibition input 23 of gate 21.

A branch 17b channels the first pulse of a response or "filling" pair to one of the inputs of "OR" gate 30; via lead 29 the second pulse of the response or "filling" pulse pair leaving coder 18 arrives at the other input of said gate 30. The output of 30 is connected via 31 to unit 32 which represents the shaping, modulation and transmission circuits of response or "filling" pulse pairs. The radio frequency signal carrying said pairs reaches antenna 1, via branch 2b of link 2.

Via a branch 17d of wire 17, gate 16 is connected to the input of a monostable multivibrator 33, the output of which is connected via wire 34 to inhibition input 35 of receiver 3.

All the components mentioned above are well known in the present state of the art and there are numerous possible embodiments for each one of them. The technician will recognize in the general layout, most of these components of the distance measuring circuits of a TACAN Transponder.

New components and new layouts which allow for the implementation of the invention are shown in the center of FIG. 1. Said new components comprise, in particular, monostable multivibrator 28 and "AND" gate 21; the most striking new feature in the layout being the fact that the output of noise pulse generator 19 is connected via wire 20, gate 21, wire 24, gate 16 and wire 17 to the input of coder 18 so that said noise pulses are not delayed in delay line 14.

Another novel feature, which is required only if the decoupling between transmitter 32 and receiver 3 is not adequate, is monostable multi-vibrator 33.

There follows a description of the operation of the equipment shown in FIG. 1 with special importance attached to the components according to the invention.

A radio frequency signal carrying a pair of interrogation pulses separated by time $t_i$, equal for instance to 12 microseconds, is picked up by antenna 1 and via connections 2 and 2a, reaches receiver 3 at a time when the latter is not inhibited by its input 35.

The pair pulses, thus detected in 3, are shaped in 5 then, via 6, reach the input of "AND" gate 7. If the second input 8 of gate 7 is not inhibited, the two pulses reach decoder 10 via wire 9.

When 10 recognizes an inquiry pair, a pulse hereafter termed "master pulse" appears on lead 11.

Since the circuits located ahead on decoder 10, and especially the intermediate frequency stages of receiver 3, generate delay T, the master pulse appears at the end of $T_r$ following the arrival of the second inquiry pulse in receiver 3.

The master pulse is delayed for time $(t_o - T - t_i)$ in delay line 14. The internal delay of the transponder according to the specifications of the TACAN, has a precise value of 50 microseconds. Delay $T_i$ caused by the transmission circuits incorporated in unit 32. In practise, T is approximately 2 or 3 microseconds and $t_i$ is 12 microseconds. Under these conditions, the delay of line 14 is 35 or 36 microseconds. The master pulse delayed in 14 reaches, via lead 15, "OR" gate 16 and thence by lead 17, the input of coder 18, and through the same channel plus branch 17b, one of the inputs of "OR" gate 30. The pulse exiting from coder 18 via 29 reaches the other input of 30. The two pulses separated by interval $t_i$ which stand at the inputs of 30 correspond to the response pulses to the inquiry. After processing in unit 32, they are transmitted by a radio frequency carrier wave emitted by antenna 1.

Immediately after decoder 10 recognizes an inquiry pair, and input 8 of gate 7 is inhibited, via branch 11a, monostable multivibrator 12 and wire 13. The inhibition duration of 8, determined by the characteristics of 12, is at least equal to dead time $t_m$, i.e. to the minimum acceptable interval between two successively transmitted pairs of pulses; in the example described, $t_m$ is 35 microseconds.

Under these conditions, a second inquiry received in 3 during this inhibition period would not be able to reach decoder 10.

As soon as 10 recognizes the first inquiry pair, input 23 of "AND" gate 21 is inhibited, via branch 11b and monostable multivibrator 28. The inhibition duration of 23, determined by the characteristics of 28, is equal to $(t_o - T - t_i)$, i.e. to the delay of line 14.

The master pulse delayed in 14 triggers via wire 15, gate 16 and branch 17c, monostable multivibrator 27, which inhibits input 22 of gate 21. The inhibition duration as determined by the characteristics of 27, is equal to $t_m$, i.e. in the example chosen, 35 microseconds.

We therefore find that after a pair of inquiry pulses is recognized at the output of 10, the pulses yielded by generator 19 cannot reach coder 18 for a period equal to $t_o + t_m - T - t_i$ i.e., in the example chosen, approximately 70 microseconds. The generation of a response to a recognized inquiry is therefore unhindered by the presence of noise pulse generator 19. If it is not necessary to inhibit receiver 3 for the duration of response transmission, the response efficiency of the transponder being almost 100 percent when the number of inquiries per second is relatively low.

It can also be seen that apart from the periods during which the transponder is busy coding and transmitting genuine responses, the transponder operates according to the well known process i.e. it transmits "filling" pulse pairs.

In some cases, however, it is necessary to protect receiver 3 for the duration of the transmission. To achieve this, the pulse standing at the output of 16 triggers monostable multivibrator 33. Via wire 34, input 35 of receiver 3 is inhibited. The inhibition duration as determined by the characteristics of 33, is equal to $t_i + 2t_d$, $t_d$ measuring the width of each response pulse; in the example chosen $t_i + 2t_d$ has a value of 19 microseconds.

In this case response efficiency for a transmission rate of 10,000 is therefore 84 percent whereas in known systems, with a 35 microsecond dead time $t_m$, efficiency does not exceed 74 percent.

Figure 2:
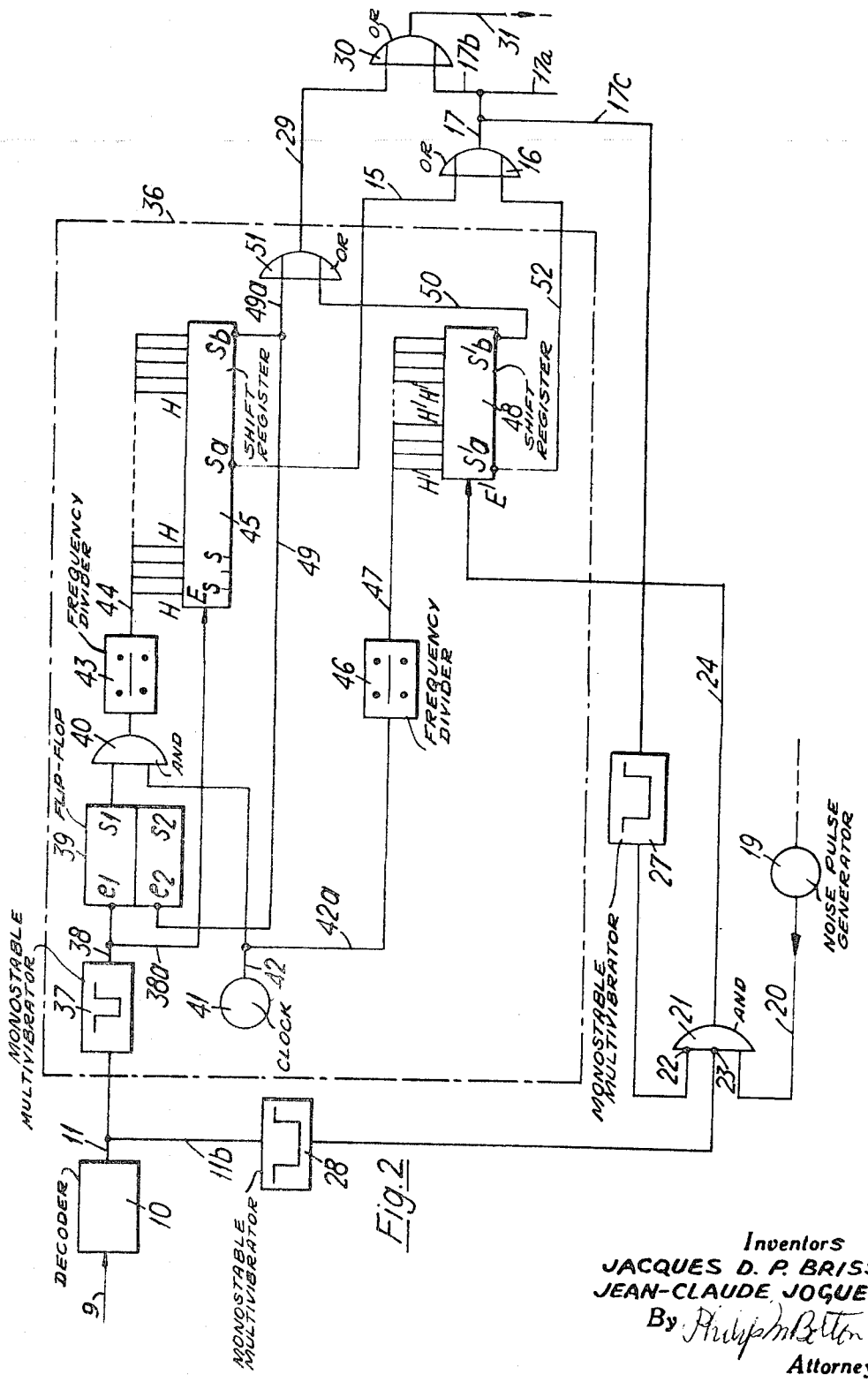
FIG. 2 shows a more detailed diagram of an embodiment of the devices according to the invention.

A specific embodiment example of the devices according to the invention and in particular delay line 14 of coder 18, is shown in FIG. 2.

Components of FIG. 1 not necessary to the understanding of the following description have not been included in FIG. 2. Those reproduced without any structural alteration bear the same references as in FIG. 1.

New components which characterize this particular example embodiment of the devices according to the invention, are in a rectangular box outlined in dots and dashes (36).

The master pulse which emerges from decoder 10 after the recognition of an inquiry arrives, via wire 11, at the input of monostable multivibrator 37 which can be finely adjusted, between 0 and 1 microsecond for instance, and makes it possible to set the internal delay of the transponder at the required value $t_o$ (50 microseconds). The output of 37 is connected via wire 38 to the write input $e_1$ of a flip-flop 39. The output $s_1$ of 39 is connected to one of the inputs of an "AND" gate 40. The other input of 40 is connected via wire 42 to a clock 41 having a frequency of 20 MHz for instance. The output of 40 is connected to a first frequency divider 43 which lowers the frequency of clock 41 to a suitable value, thus creating a time base with an interval (or "step") of one microsecond, for instance. The output of divider 43 is connected via wire 44 to the timing inputs H of a first shift register 45. The pulse input E of 45 is connected by a branch 38a of lead 38 to the output of 37. The register has p stages; each stage having its output but the only outputs used being output $S_a$ and final output $S_b$. The delay occurring between the master pulse entering at E in register 45 and the delayed pulse which emerges at $S_b$ must be equal to $t_o -$ T i.e. slightly less than 50 microseconds. Consequently as the steps last 1 microsecond, the number p of stages is slightly lower than 50. The determination of p will be discussed later.

Output S of register 45 corresponds to a delay $(t_o - T - t_i)$ i.e. in this case 35 to 36 microseconds.

A branch 42a of lead 42 connects the output of clock 41 to a second frequency divider 46 which lowers the frequency of 41 to a suitable value thus creating a time base with an interval (or "step") also of 1 microsecond. The output of divider 46 is connected via lead 47 to the speed outputs H' of a second shift register 48. The pulse input E' of 48 is connected via wire 24 to the output of "AND" gate 21, the function of which was described with reference to the components of FIG. 1.

Register 48 has q stages; each stage has its output but only output $S'_a$ of the first stage and output $S'_b$ of the last stage are used. The delay occurring between the pulses emerging respectively from $S'_a$ and $S'_b$ must be equal to $t_i$ i.e. 12 microseconds; consequently q equals 13.

Wire 49 links output $S_b$ of register 45 to erasure input $e_2$ of flip-flop 39. Outputs $S_b$ of 45 and $S'_b$ of 48 are linked respectively by a branch 49a of lead 49 and a lead 50 to the two inputs of an "OR" gate 51.

Outputs $S_a$ of 45 and $S'_a$ of 48 are linked respectively via lead 15 and a wire 52 to the two inputs of "OR" gate 16 already mentioned.

Finally, as explained when describing the devices of FIG. 1, the outputs of 51 and 16 are linked in "OR" gate 30; at the output of 30 stand the response pulse pairs or "filling" pairs.

There follows a description of the operation of the circuits shown in FIG. 2.

It is assumed that before a pulse appeared at the output of 10, flip-flop 39 is in state "0" ($s_1 = 0$). Gate 40 is closed and no timing pulses are applied to first register 45.

On the other hand, the timing pulses produced by divider 46 are applied to second register 46. If gate 21 is not inhibited the noise pulses generated by 19 reach input E' of 48. They move forward in 48 at the time base pace. At the outputs $S'_a$ and $S'_b$ stand at an interval of 12 microseconds, these two pulses comprising a "filling" pair.

As soon as an inquiry interrogation is recognized as such, the master pulse emerging from 10 locks, as has already been noted, gate 21 for a period ($t_o - T - t_i$) (35 to 36 microseconds). The master pulse is delayed by monostable multivibrator 37 for a period between 0 and 1 microsecond; via wire 38, it turns 39 into state "1" ($s_1 = 1$). Gate 40 opens. Via wire 42 and gate 40, clock pulses 41 reach divider 43. Timing pulses, via wire 44, are applied to inputs H of register 45.

Via branch 38a, the master pulse is applied to input E of register 45.

The interval between the arrival of the first timing pulse and that of the master pulse at register 45 is at least equal to a step of clock 41, i.e. in the example chosen: 0.05 microsecond.

The pulse moves forward in register 45, according to the time base pace, reaches output $S_a$ after a period ($t_o - T - t_i$) i.e. 35 to 36 microseconds) and arrives at output $S_b$ after a period ($t_o - T$) i.e. 47 to 48 microseconds).

The two pulses (occurring at an interval of 12 microseconds) which emerge at $S_a$ and $S_b$ are linked via gates 16 and 51 in gate 30. They constitute the response pair to the inquiry.

The pulse which emerges at $S_b$, via wire 49, triggers 39 which reverts to state "0" ($s_1 = 0$) and gate 40 closes, awaiting a new master pulse.

A further word about the multivibrator 37 is in order here. Given the "quantic" nature of the operation of a shift register, it is impossible to achieve a delay which is not a multiple of the step, i.e., in the present case, an integral number of microseconds. It is therefore necessary to incorporate a balancer which adds delay T to an integral number of microseconds. This is precisely the role of multivibrator 37.

Although the principles of the present invention have been described hereinabove with reference to a particular example or embodiment, it will be clearly understood that the said description has been only made by way of example and does not limit the scope of the invention.

We claim:

1. A transponder for transmitting a coded, spaced response pulse pair whenever coded interrogation pulse pair having predetermined spacing is received and recognized, comprising:

means including an antenna and receiver for receiving said interrogation pulse pairs;

a decoder responsive to the output of said receiver for recognizing said coded interrogation pulse pair and for generating an output signal representative of said recognition;

response pulse pair encoding and transmitting means;

delay means responsive to and in series with said decoder output for introducing a predetermined system delay between said recognition and transmission of said response pulse pair;

a random distribution noise pulse generator and control means for generating a predetermined maximum number of randomly distributed noise pulses per unit of time, said random pulses being applied to said encoding and transmitting means for transmitting pulse pairs from said transponder substantially independently of said decoder output signal;

and first inhibiting means responsive to said decoder output signal for preventing said randomly distributed pulses from reaching said encoding and transmitting means during a predetermined dead time after each transmitted response.

2. Apparatus according to claim 1 including second inhibiting means associated with said decoder for inhibiting the generation of said decoder output signals for a period at least equal to said predetermined dead time after each of said decoder output signals corresponding to an interrogation recognition, and said first inhibiting means are defined as being responsive to both said delay means output and said random pulses to inhibit said encoding and transmitting means after each transmission, whether said transmission was initiated by said recognized interrogations or by any of said random noise pulses.

3. Apparatus according to claim 2 in which said control means associated with said noise pulse generator is responsive to the signals at the input of said encoding means, whereby the number of noise pulses generated is controlled so that the sum of said noise pulses and decoder output pulses does not exceed said maximum predetermined number.

4. Apparatus according to claim 3 including means responsive to said encoder input for inhibiting the operation of said receiver for a second predetermined time following each interrogation recognition output signal from said decoder.

5. Apparatus according to claim 4 in which said second predetermined time is at least equal to the time separation between the pulses of a response pair plus the durations of the two pulses of said response pair.

6. Apparatus according to claim 4 in which said second predetermined time is substantially equal to twice the transmitted pulse width plus the spacing between pulses of said response pulse pair.

7. Apparatus according to claim 1 in which said delay means and said response pulse pair coder comprises a first shift register having a total overall delay of said predetermined system delay plus the time between pulses of said response pulse pair.

8. Apparatus according to claim 7 in which said random distribution noise pulse generator includes a second shift register having a total delay equal to said time between pulses of said response pulse pair, said shift register being connected to generate the second pulse of said response pair from the first pulse of said pair at the input of said second shift register.

* * * * *

UNITED STATES PATENT OFFICE
CERTIFICATE OF CORRECTION

Patent No. 3,706,992              Dated December 19, 1972

Inventor(s) Jacques Daniel Phillippe Brisse and Jean-Claude Joguet

It is certified that error appears in the above-identified patent and that said Letters Patent are hereby corrected as shown below:

On the Title Page add the following:

[30] Foreign Application Priority Data

August 8, 1969      France       6927328

Signed and sealed this 11th day of June 1974.

(SEAL)
Attest:

EDWARD M. FLETCHER, JR.
Attesting Officer

C. MARSHALL DANN
Commissioner of Patents